Dec. 26, 1944.  H. C. EDWARDS  2,365,752
FUEL INJECTOR
Filed April 11, 1942
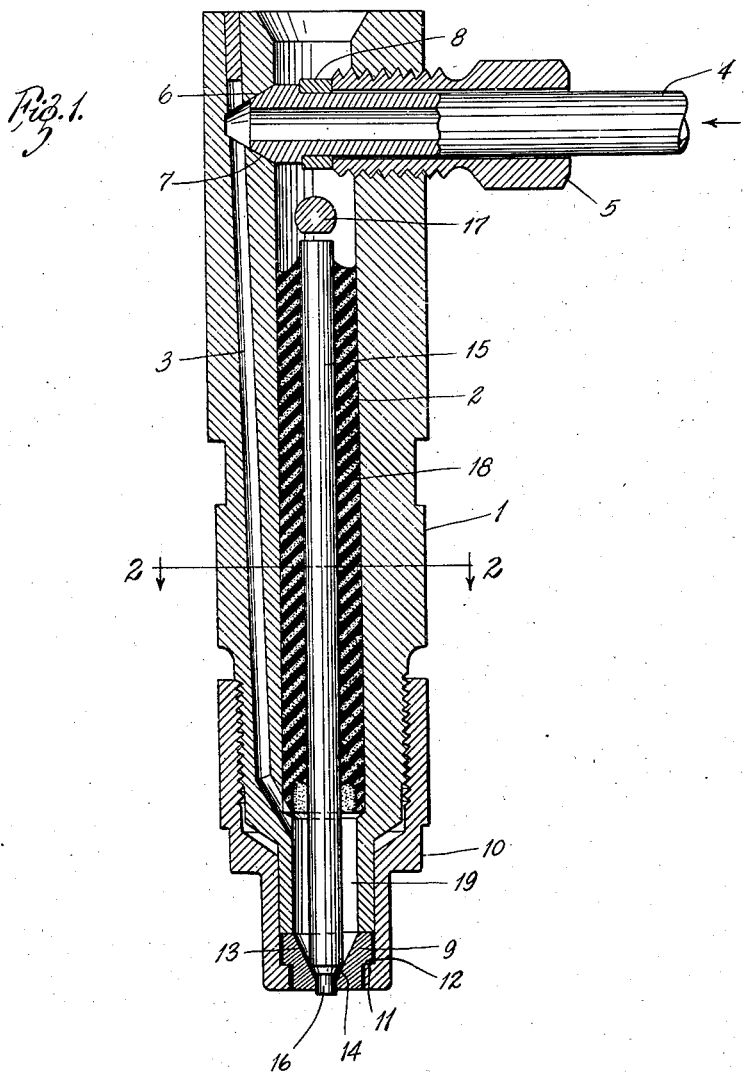
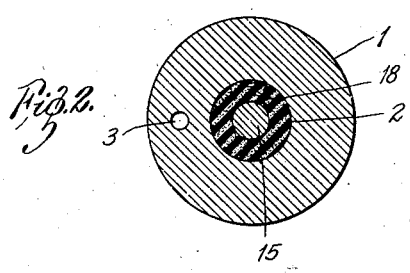
INVENTOR:
Herbert C. Edwards,
by Carr Van & Gravely,
HIS ATTORNEYS.

Patented Dec. 26, 1944

2,365,752

UNITED STATES PATENT OFFICE 2,365,752

FUEL INJECTOR

Herbert C. Edwards, Massillon, Ohio, assignor to The Timken Roller Bearing Company, Canton, Ohio, a corporation of Ohio Application April 11, 1942, Serial No. 438,531

5 Claims. (Cl. 299—107.6)

This invention relates to fuel injectors for compression-ignition oil engines, and more particularly to fuel injectors of the type having a loaded delivery valve that is opened hydraulically by the fuel pressure. The invention has for its principal object to provide the injector with a simple and efficient non-metallic valve loading device, to provide for economy and durability of construction, and to obtain other advantages hereinafter appearing. The invention consists in the fuel injector and in the parts and combinations and arrangement of parts hereinafter described and claimed.

In the accompanying drawing, which forms part of this specification and wherein like symbols refer to like parts wherever they occur, Fig. 1 is a central longitudinal section through a fuel injector embodying my invention, the valve being shown closed; and Fig. 2 is a transverse section on the line 2—2 in Fig. 1.

In the accompanying drawing, my invention is shown embodied in a fuel injector for an internal combustion engine of the Diesel type. The injector comprises a cylindrical body 1 having an axial bore 2 extending therethrough from end to end thereof and a longitudinal fuel passageway 3 that leads downwardly through said body from a point short of the upper end thereof and opens into said bore near the lower end thereof. A fuel supply pipe 4 extends through a tubular fitting 5 that is threaded through a radial hole provided therefor in the upper end of the body 1 on the side thereof opposite the fuel passageway 3. The fuel supply pipe 4 terminate at its discharge end in a tapered head portion 6 that seats in a correspondingly tapered radial hole 7 leading from the axial bore 2 of the body 1 to the fuel passageway 3 and opens into the latter. As shown in the drawing, a sleeve 8 is sleeved on the fuel supply pipe 4 between the shoulder formed by the conical head 6 thereof and the inner end of the threaded fitting 5, whereby said conical head is firmly seated in the conical hole 7 in the body 1 when the fitting 5 threaded therein is tightened.

An annular orifice member 9 is clamped to the discharge end of the body 1 in register with the axial bore thereof by means of a sleeve nut 10 that is threaded on said body and has an internal annular shoulder 11 adapted to bear against an external annular shoulder 12 on said orifice member and thus rigidly clamp the same flatwise to said end of said body. The opening 13 in the annular orifice or nozzle member 9 tapers downwardly from its upper to its lower end, the diameter of said opening at the upper or inner end thereof corresponding substantially to the diameter of the adjacent end of the axial bore 2 of the body 1.

The tapered fuel discharge opening 13 in the orifice piece 9 of the injector forms a conical seat for a conical valve 14 having an upwardly extending stem 15 that is reciprocable in the bore 2 of the body 1 to seat and unseat said valve. The valve 14 has a pin or pintle 16 that projects from the lower or outer end thereof and is adapted, when said valve is lifted off its seat, to cooperate with the opening 13 in the orifice member 9 to form an annular discharge orifice. Upward or opening movement of the valve 14 is limited by means of a diametral stop pin 17 located in the body 1 opposite the upper end of the valve stem 15.

Interposed between the axial bore 2 of the body 1 and the valve stem 15 therein is an axially resilient bushing or tube 18 which is secured in said bore and to said valve stem and serves to press the valve 14 against its seat in the nozzle member 9 and as a holder for said stem. The material which I contemplate using for making the bushing or tube 18 is a treated rubber or synthetic rubber, such as neoprene, which is resistant to oil and is permanently bonded by vulcanizing to the surfaces of the bore 2 and valve stem 15, the rubber having sufficient elasticity to permit axial movement of said stem in said bore without destroying the bond between said bushing and said stem and said bore. This rubber tube or bushing 18 extends from a point adjacent to the upper end of the valve stem 15 to a point adjacent to the lower end of the fuel passageway 3, the unoccupied space between the lower end of said bushing and the nozzle member 9 constituting an annular chamber 19 for fuel supplied thereto by said passageway.

By the arrangement described, the elastic valve closing bushing 18 is deflected axially inwardly in the body 1 of the injector by the inward pressure exerted on the valve 14 by the nozzle piece 16 when the sleeve nut 10 is threaded on said body to clamp said nozzle piece thereto, the static load on said valve depending on the consistency of the rubber, the length and thickness of said bushing and the amount of axial deflection or distortion of the latter. During the threading of the sleeve nut 10 on the body 1, the annular nozzle member 9 is centered by contact of the tapered valve seat 13 therein with the tapered valve 14 carried by the valve stem or plunger 15, perfect alinement of said valve and seat being obtained when said sleeve nut is firmly tightened in place.

In operation, liquid fuel under high pressure is delivered by the supply pipe 4 to the passageway 3 and is conducted thereby to the annular chamber 19 and fills the same. As soon as the pressure in the fuel chamber 19 reaches a predetermined injection pressure, the valve 14 is lifted off its seat and allows the fuel to escape through the annular discharge orifice formed by the nozzle pin 16 and the spray opening 13 in the nozzle member 9. This opening movement of the valve 14 further increases the axial deflection of the rubber bushing 18; and, when the fuel pressure is again reduced, the axially strained or distorted bushing tends to quickly recover its original shape and thereby forces said valve to its seat. The rubber bushing also serves as a support or holder for the valve stem as well as a loading means for the valve. The rubber bushing also operates as a seal to prevent leakage of fuel between the valve stem and said bushing and between the latter and the axial bore of the body of the injector, thereby dispensing with the need for leak-off connections between the injector and the service tank.

Obviously, the hereinbefore described invention is not limited to the type of fuel injector shown and described.

What I claim is:

1. A fuel injector comprising a body adapted to be supplied with fuel under pressure and having a discharge opening for said fuel and a valve for said opening adapted to be opened by the injection pressure of said fuel, said valve having a stem extending into said body, and loading means for said valve, said loading means comprising a separate rubber bushing interposed between and vulcanized to said body and valve stem and constituting a seal to prevent leakage of fuel therebetween, said bushing being axially pretensioned to hold said valve in closed position under pressure less than injection pressure and being capable of further axial tensioning to permit said valve to open at injection pressure.

2. A fuel injector comprising a body having a bore with a fuel inlet, a fuel outlet and a valve seat adjacent to the latter, a reciprocable valve for said valve seat adapted to be opened by the injection pressure of fuel supplied to said inlet, said valve having a stem rigid therewith and disposed in said bore, loading means for said valve comprising a rubber sleeve interposed between and vulcanized to said bore and stem, means for axially pretensioning said sleeve in said body to hold said valve in closed position under pressure less than injection pressure, said sleeve being capable of further axial tensioning to permit said valve to open at injection pressure, and a stop member located in said bore opposite the inner end of said stem for limiting the opening movement of said valve.

3. A fuel injector comprising a body having a bore with a fuel inlet, a fuel outlet and a valve seat adjacent to the latter, a reciprocable valve for said valve seat adapted to be opened by the injection pressure of fuel supplied to said inlet, said valve having a stem rigid therewith and disposed in said bore, loading means for said valve comprising a rubber sleeve interposed between and vulcanized to said bore and stem, and means for axially pretensioning said sleeve to said body to hold said valve in closed position under pressure less than injection pressure, said sleeve being capable of further axial tensioning to permit said valve to open at injection pressure, said pretensioning means comprising a member threaded on said body and exerting an axial thrust on said sleeve.

4. A fuel injector comprising a cylindrical body having an axial bore opening through one end of said body and a fuel inlet passageway opening into said bore, a nozzle member secured to said end of said body and having a discharge opening registering with said bore and a valve seat in said discharge opening, a reciprocable valve for said valve seat adapted to be opened by the injection pressure of fuel supplied to said bore by said fuel inlet passageway, said valve having a stem disposed in said bore, and loading means for said valve comprising a rubber sleeve interposed between and vulcanized to said bore and stem inwardly of the point of communication of said inlet passageway with said bore, said sleeve being axially pretensioned by pressure transmitted thereto by said nozzle member to thereby hold said valve in closed position against pressure less than injection pressure and being capable of further axial tensioning to permit said valve to open at injection pressure.

5. A fuel injector comprising a cylindrical body having an axial bore with a fuel outlet, a reciprocable valve for said outlet, said valve having a stem rigid therewith and disposed in said bore, loading means for said valve comprising an axially pretensioned rubber sleeve interposed between and vulcanized to said bore and stem, said body having a longitudinal fuel passageway therein opening into said bore between said valve and the adjacent end of said sleeve, a tapered radial hole leading from said bore to said passageway beyond the other end of said sleeve, and a threaded crossbore opening into said axial bore opposite said tapered radial hole, a fuel supply pipe extending through said cross-bore and having a tapered head portion seating in said tapered hole, and a tube threaded into said cross-bore and bearing endwise against said head to seat the same in said tapered hole.

HERBERT C. EDWARDS.